United States Patent
Mouri et al.

(10) Patent No.: US 7,230,062 B2
(45) Date of Patent: Jun. 12, 2007

(54) ACRYLIC COPOLYMER

(75) Inventors: Makoto Mouri, Seto (JP); Hisato Takeuchi, Chita (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 325 days.

(21) Appl. No.: 11/054,410

(22) Filed: Feb. 10, 2005

(65) Prior Publication Data
US 2005/0182224 A1 Aug. 18, 2005

(30) Foreign Application Priority Data
Feb. 12, 2004 (JP) ............................. 2004-035008

(51) Int. Cl.
*C08F 220/10* (2006.01)
(52) U.S. Cl. .................. 526/328.5; 526/319; 526/320; 526/322; 526/329.5
(58) Field of Classification Search ................ 526/319, 526/320, 322, 328.5, 329.5
See application file for complete search history.

(56) References Cited
U.S. PATENT DOCUMENTS
2,559,635 A 7/1951 Kenyon et al.

OTHER PUBLICATIONS

T Hongo, et al., "Radical Copolymerization of Methyl α-Acyloxyacrylates with Some Vinyl Monomers", Polymer International, vol. 48, 1999, pp. 505-508.
Hitoshi Tanaka, et al., "Conversion-Dependent Molecular Weight of the Polymer in Free Radical Polymerization of Captodative Substituted (Acyloxy) Acrylates", Macromolecules, 1997, vol. 30, pp. 4010-4012.

*Primary Examiner*—Helen L. Pezzuto
(74) *Attorney, Agent, or Firm*—Oblon, Spivak, McClelland, Maier & Neustadt, P.C.

(57) ABSTRACT

An acrylic copolymer consisting of a first acrylic monomer represented by the following general formula (1):

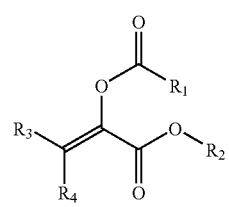

(1)

[where each of $R_1$ and $R_2$ represents an aliphatic hydrocarbon group whose main chain is composed of 3 or less carbon atoms, and each of $R_3$ and $R_4$ represents a hydrocarbon atom], and
a second acrylic monomer represented by the following general formula (2):

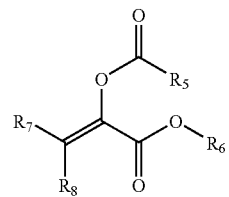

(2)

[where at least one of $R_5$ and $R_6$ represents an aliphatic hydrocarbon group whose main chain is composed of 4 to 60 carbon atoms, in the case where one of the $R_5$ and $R_6$ does not represent the aliphatic hydrocarbon group, it represents an aliphatic hydrocarbon group whose main chain is composed of 3 or less carbon atoms, and each of $R_7$ and $R_8$ represents a hydrogen atom],
wherein the first acrylic monomer makes up 50 to 99 % of total monomer units in the copolymer.

14 Claims, 1 Drawing Sheet

ACRYLIC COPOLYMER

BACKGROUND OF THE INVENTION

1. Field of the Invention

The present invention relates to an acrylic copolymer and, more particularly, to an acrylic copolymer consisting of at least two types of acrylic monomers.

2. Related Background Art

Heretofore, researches have been conducted on acrylic resin which is considered to be excellent organic glass in processability, light transmittance, specific gravity, safety and the like as compared to general glass. In particular, polymethyl methacrylate (PMMA), which is a hard and transparent material with high light transmittance, has been used in applications including materials for automobile components and optical members. However, PMMA is subject to thermal decomposition and offers low heat resistance, incurring limitations in application range.

Meanwhile, a polymer of acrylic ester having acyloxy groups with a small number of carbon atoms at its α position is described in "Conversion-Dependent Molecular Weight of the Polymer in Free Radical Polymerization of Captodative Substituted (Acyloxy)acrylates" (H. Yanaka, et al., Macromolecules, Vol. 30, No. 14, (1997) pp. 4010–4012) (Document 1). However, Document 1 merely reveals relation between the molecular weight of the resulting polymer and the polymerizability of the acrylic ester, relation between the molecular weight of the resulting polymer and polymerization conditions, and the like. Accordingly, an elastic modulus, heat resistance and mechanical properties of the resulting polymer have not been revealed. In this connection, the present inventors prepared and evaluated the polymer described in Document 1. In this study, they confirmed that the resulting polymer has an elastic modulus (an elastic modulus in typical working temperature range, hereinafter referred to as "a normal temperature elastic modulus") equal to that of PMMA and offers higher heat resistance (an elastic modulus and resistance to thermal decomposition at higher temperatures, hereinafter collectively referred to as "heat resistance") than PMMA. However, the polymer described in Document 1 hardly softens below the thermal decomposition temperature, and therefore still remains unsatisfactory in that general molding methods cannot be used for molding.

Moreover, in U.S. Pat. No. 2,559,635 (Document 2) and "Radical copolymerization of methyl α-acyloxyacrylates with some vinyl monomers" (T. Hongo, et al., Polymer International, Vol. 48 (1999) pp. 505–508) (Document 3), there is described a copolymer of acrylic ester having acyloxy groups with a small number of carbon atoms at its α position and vinyl monomer such as styrene, methyl methacrylate and acrylonitrile. However, since Documents 2 and 3 have also not revealed the elastic modulus, heat resistance and mechanical properties of the resulting copolymer, the present inventors prepared and evaluated the copolymer described in these documents. In this study, they found out that the resulting copolymer offered reduced normal temperature elastic modulus and heat resistance compared to the polymer described in Document 1, and therefore concluded that this copolymer still remains unsatisfactory.

SUMMARY OF THE INVENTION

The present invention was accomplished in view of the foregoing problems of the related art, and an object thereof is to provide acrylic resin which has a normal temperature elastic modulus equal to that of PMMA, has higher heat resistance than PMMA, and has excellent formability which is attributed to the fact that the acrylic resin softens moderately below the thermal decomposition temperature.

The present inventors have conducted a number of extensive studies in order to achieve the foregoing object. As a result, surprisingly, they found out that acrylic resin (an acrylic copolymer) can be obtained, which is dramatically improved in its formability while the normal temperature elastic modulus and heat resistance thereof are maintained at higher levels. This can be achieved by mixing at least two types of acrylic monomers, which satisfy specific conditions, at a predetermined mixing ratio and by allowing copolymerization between the monomers to occur. Thus, the present invention has been completed.

The present invention provides an acrylic copolymer consisting of at least a first acrylic monomer represented by the following general formula (1):

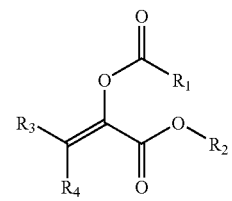

where $R_1$ and $R_2$ may be the same or different from each other, each of which represents a group selected from the group consisting of an aliphatic hydrocarbon group, an aliphatic group and an aromatic hydrocarbon group (here, the main chain of the aliphatic hydrocarbon group is composed of 3 or less carbon atoms; the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and $R_3$ and $R_4$ may be the same or different from each other, each of which represents a group selected from the group consisting of a hydrogen atom, an aliphatic hydrocarbon group, an aliphatic group and an aromatic hydrocarbon group (here, the main chain of the aliphatic hydrocarbon group is composed of 3 or less carbon atoms; the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and a second acrylic monomer represented by the following general formula (2)

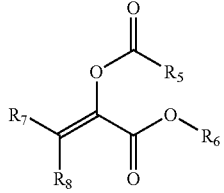
(2)

where $R_5$ and $R_6$ may be the same or different from each other, and at least one of $R_5$ and $R_6$ represents a group selected from the group consisting of an aliphatic hydrocarbon group and an aliphatic group (here, the main chain of the aliphatic hydrocarbon group is composed of 4 to 60 carbon atoms; and the aliphatic group is one obtained by substituting some of the carbon atoms in the aliphatic hydrocarbon group with at least one atom selected from the group consisting of an oxygen atom, a sulfur atom, a silicon atom and a nitrogen atom), and in the case where one of the $R_5$ and $R_6$ represents neither the above-described aliphatic hydrocarbon group nor the above-described aliphatic group, it represents a group selected from the group consisting of an aliphatic hydrocarbon group, an aliphatic group and an aromatic hydrocarbon group (here, the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and $R_7$ and $R_8$ may be the same or different from each other, each of which represents a group selected from the group consisting of a hydrogen atom, an aliphatic hydrocarbon group, an aliphatic group and an aromatic hydrocarbon group (here, the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), wherein the first acrylic monomer makes up 50 to 99% of total monomer units in the copolymer.

In the acrylic copolymer of the present invention, the $R_1$ and $R_2$ may be the same or different from each other. Each of the $R_1$ and $R_2$ preferably represents a group selected from the group consisting of methyl, ethyl, propyl, isopropyl, t-butyl, isobutyl, 1,1-dimethylpropyl, 1,1,2-trimethylpropyl, 1,2,2-trimethylpropyl, 2,2-dimethylpropyl, 1,2-dimethylpropyl, 1-ethylpropyl, 1,1,2,2-tetramethylpropyl and 2-methylpropyl, and more preferably represents a group selected from the group consisting of methyl, ethyl, isopropyl and t-butyl.

In the acrylic copolymer of the present invention, each of the $R_3$ and $R_4$ preferably represent a hydrogen atom.

In the acrylic copolymer of the present invention, the $R_5$ and $R_6$ may be the same or different from each other. At least one of the $R_5$ and $R_6$ preferably represents a group selected from the group consisting of n-butyl, n-pentyl, n-hexyl, n-heptyl, n-octyl, n-nonyl, n-decyl, n-decenyl, lauryl, myristyl, myristoyl, n-pentadecyl, n-pentadecenyl, palmityl, palmitoyl, n-hexadecadienyl, n-hexadecatrienyl, n-hexadecatetraenyl, n-heptadecanyl, n-heptadecenyl, stearyl, oleyl, linoyl, α-linolenyl, γ-linolenyl, n-octadecatetraenyl, arachidinyl, n-eicosenyl, n-eicosadienyl, n-eicosatrienyl, n-eicosatetraenyl, arachidonyl, n-eicosapentaenyl, n-heneicosapentadecenyl, behenyl, n-dococenyl, n-docosadienyl, n-docosatetradecenyl, n-docosapentaenyl, n-docosahexaenyl, lignocerinyl and tetracocenyl, and more preferably represents a group selected from the group consisting of n-butyl, n-pentyl, n-hexyl, n-heptyl, n-octyl, n-nonyl, n-decyl, n-decenyl, lauryl, n-pentadecyl and stearyl.

In the acrylic copolymer of the present invention, each of the $R_7$ and $R_8$ preferably represents a hydrogen atom.

The acrylic copolymer of the present invention preferably has a number-average molecular weight of 10000 to 500000.

In the acrylic copolymer of the present invention, the second acrylic monomer preferably makes up 1 to 50% of total monomer units in the acrylic copolymer, and if the second acrylic monomer has an aliphatic hydrocarbon group whose main chain is composed of 6 to 7 carbon atoms as at least one of the $R_5$ and $R_6$, the second acrylic monomer preferably makes up 1 to 40% of total monomer units in the acrylic copolymer, and if the second acrylic monomer has an aliphatic hydrocarbon group whose main chain is composed of 8 to 60 carbon atoms as at least one of the $R_5$ and $R_6$, the second acrylic monomer preferably makes up 1 to 30% of total monomer units in the acrylic copolymer.

The acrylic copolymer of the present invention is preferably represented by the following general formula (3):

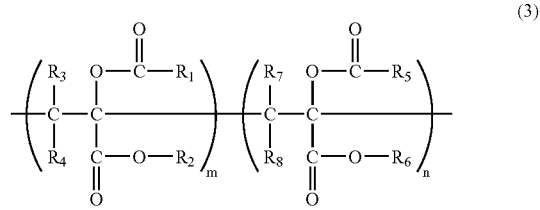
(3)

[where $R_1$ to $R_8$ are synonymous with $R_1$ to $R_4$ in the formula (1) and $R_5$ to $R_8$ in the formula (2) and may be any one of a block copolymer and a random copolymer], and more preferably is a random copolymer.

According to the acrylic copolymer of the present invention as described above, the following high level normal temperature elastic modulus and excellent formability can be achieved at the same time: the storage modulus at 25° C. is preferably $1 \times 10^9$ Pa or above; and the storage modulus at 25° C. is preferably $1 \times 10^7$ Pa or below.

Incidentally, the reason why the acrylic copolymer of the present invention offers significantly enhanced formability while the normal temperature elastic modulus and heat resistance thereof are maintained at higher levels still remains elusive. However, the present inventors conjecture as follows. That is, in the conventional polymer which consists of acrylic ester having acyloxy groups with a small number of carbon atoms at its α position, the —OCOR groups substituting at α position significantly reduce the molecular mobility of the polymer molecules, and thereby the normal temperature elastic modulus and heat resistance are increased. In addition, even when this polymer is heated to the thermal decomposition temperature, the polymer does not soften to the level at which typical molding methods can be used for the molding thereof. In contrast, the present inventors conjecture that, in the acrylic copolymer of the present invention, at least two types of acrylic monomers having different properties from each other, are mixed at a predetermined mixing ratio and are copolymerized with each other, thereby increasing the molecular mobility of the polymer molecules as compared with the above-described conventional polymer. Accordingly, the copolymer softens below the heat decomposition temperature to the level at which molding can be performed. Incidentally, the properties of copolymer which consists of two or more monomer components generally show intermediate properties between properties of each homopolymer consisting of each monomer. Specifically, as similar to the conventional polymer described above, if another monomer component is copolymerized with monomer components capable of producing a polymer having higher normal temperature elastic modulus and heat resistance in order to increase formability of the resulting copolymer, the elastic modulus and heat resistance thereof are generally reduced while formability is increased. However, in the acrylic copolymer of the present invention, the formability, which needs to be improved, is increased without reducing high elastic modulus and heat resistance, and such a high elastic modulus and heat resistance are equal to those of acrylic monomer having highest normal temperature elastic modulus and heat resistance among acrylic monomers to be used for producing a polymer, which is surprising.

According to the present invention, it is possible to provide an acrylic resin which has a normal temperature elastic modulus equal to that of PMMA, has higher heat resistance than PMMA, and has excellent formability which is achieved because the acrylic resin softens moderately below the thermal decomposition temperature.

DETAILED DESCRIPTION OF THE PREFERRED EMBODIMENTS

Figure 1:
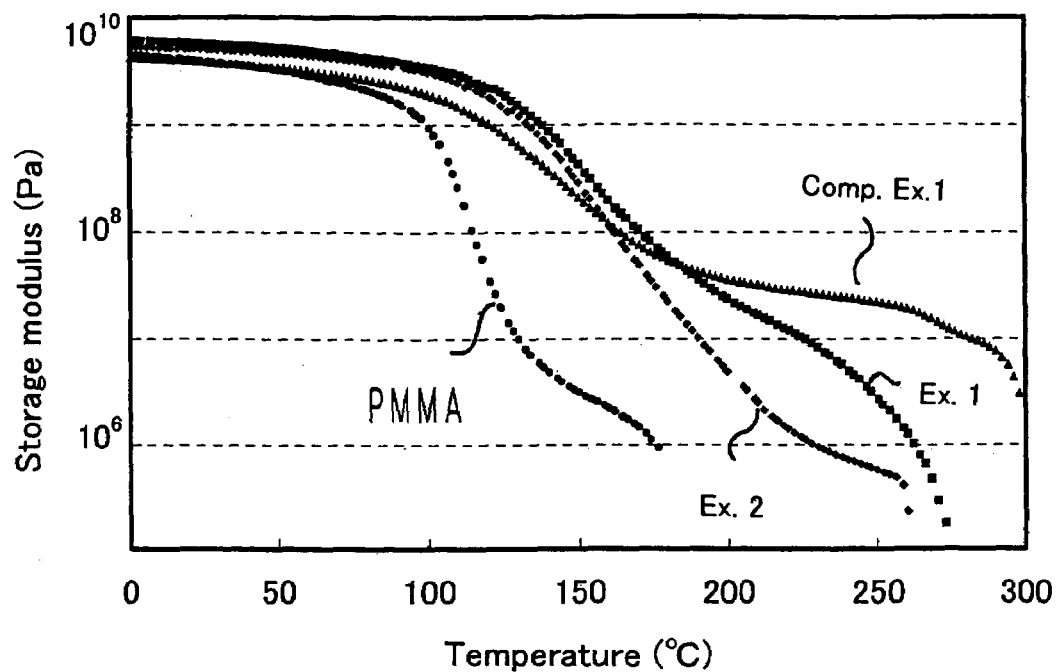
FIG. 1 is a graph showing the measurement results of dynamic viscoelasticity of copolymers prepared in examples 1 and 2, a homopolymer prepared in comparative example 1, and PMMA.

Hereinafter, the present invention will be described in detail in accordance with preferred embodiments thereof.

First, a description will be given of a first acrylic monomer and a second acrylic monomer, which are monomer components used to prepare the acrylic copolymer of the present invention.

The first acrylic monomer used in the present invention is represented by the following general formula (1):

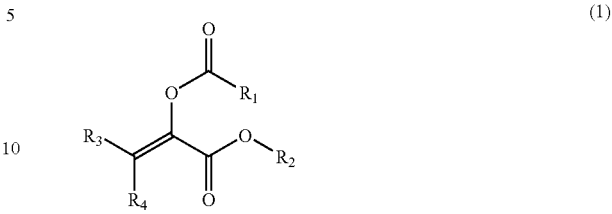

Further, in the formula (1), $R_1$ and $R_2$ may be the same or different from each other, each of which represents a group selected from the group consisting of an aliphatic hydrocarbon group, an aliphatic group and an aromatic hydrocarbon group. Here, the main chain of the aliphatic hydrocarbon group is composed of 3 or less carbon atoms, the aliphatic group is one obtained by substituting some of the carbon atoms in the aliphatic hydrocarbon group with at least one atom selected from the group consisting of an oxygen atom, a sulfur atom, a silicon atom and a nitrogen atom, and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom.

As used herein, a main chain means longest chain constituting relevant aliphatic group. For the aliphatic hydrocarbon group whose main chain is composed of 3 or less carbon atoms, methyl, ethyl, propyl, isopropyl, t-butyl, isobutyl, 1,1-dimethylpropyl, 1,1,2-trimethylpropyl, 1,2,2-trimethylpropyl, 2,2-dimethylpropyl, 1,2-dimethylpropyl, 2-methylpropyl, 1-ethylpropyl, and 1,1,2,2-tetramethylpropyl can be cited. Among these groups, it is preferable to adopt methyl, ethyl, isopropyl and t-butyl. If a monomer having an aliphatic hydrocarbon group whose main chain is composed of 4 or more carbon atoms is used as the first acrylic monomer, the normal temperature elastic modulus of the resulting copolymer will be reduced.

Note that, if each of $R_1$ and $R_2$ represents an aliphatic hydrocarbon group, it is particularly preferable that $R_1$ and $R_2$ represent a group selected from the group consisting of methyl, ethyl, isopropyl and t-butyl. When each of $R_1$ and $R_2$ represents an aliphatic hydrocarbon group, the normal temperature elastic modulus of the resulting copolymer tends to be reduced if the number of carbon atoms constituting the main chain of the aliphatic hydrocarbon group is 3 or more.

Moreover, some of the carbon atoms in the aliphatic hydrocarbon group (preferably 50% or less of the total carbon atoms) may be substituted with at least one atom selected from the group consisting of an oxygen atom, a sulfur atom, a silicon atom and a nitrogen atom and, as for the aliphatic group to be produced, 1-methoxypropyl, (1-methylthio)ethyl, dimethylethylsilyl, dimethylaminomethyl and the like can be cited.

Further, as for the aromatic hydrocarbon group which is composed of 4 or less fused benzene rings, phenyl, naphthyl, anthryl, phenanthryl and quinolyl can be cited. When a monomer having an aromatic hydrocarbon group which is composed of 5 or more fused benzene rings is used as the first acrylic monomer, the elastic modulus of the resulting copolymer at higher temperatures is excessively increased, and formability thereof is reduced.

Furthermore, any of the aliphatic hydrocarbon group and the aliphatic group may be bound to the aromatic hydrocarbon group as the substituent group and, as for the aromatic hydrocarbon group having such substituent groups, isopropylphenyl, ethylnaphthyl, methoxyanthryl, dimethylaminophenanthryl, methylquinolyl and the like can be cited.

In the formula (1), $R_3$ and $R_4$ may be the same or different from each other, each of which represents a group selected from the group consisting of a hydrogen atom, an aliphatic hydrocarbon group, an aliphatic group and an aromatic hydrocarbon group. Here, the main chain of the aliphatic hydrocarbon group is composed of 3 or less carbon atoms, the aliphatic group is one obtained by substituting some of the carbon atoms in the aliphatic hydrocarbon group with at least one atom selected from the group consisting of an oxygen atom, a sulfur atom, a silicon atom and a nitrogen atom, and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom. However, from the viewpoint of further enhancing polymerization reactivity, it is particularly preferable that each of $R_3$ and $R_4$ represents a hydrogen atom.

Concerning the acrylic copolymer of the present invention, the first acrylic monomer needs to be mixed so that it constitutes from 50 to 99%, preferably from 50 to 95%, of total monomer units in the resulting copolymer. If the mixing ratio of the first acrylic monomer is below 50%, the resulting copolymer undesirably offers reduced normal temperature elastic modulus and heat resistance. On the other hand, if the mixing ratio of the first acrylic monomer exceeds 99%, the formability of the resulting copolymer cannot be sufficiently improved. Note that, one type of acrylic monomer, or acrylic monomers obtained by mixing two or more types of acrylic monomers may be used as the first acrylic monomer according to the present invention.

The second acrylic monomer used in the present invention is represented by the following general formula (2):

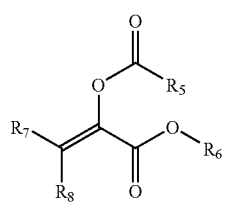

(2)

In the formula (2), $R_5$ and $R_6$ may be the same or different from each other. At least one of $R_5$ and $R_6$ represents a group selected from the group consisting of an aliphatic hydrocarbon group and an aliphatic group. Here, the main chain of the aliphatic hydrocarbon group is composed of 4 to 60 carbon atoms, and the aliphatic group is one obtained by substituting some of the carbon atoms in the aliphatic hydrocarbon group with at least one atom selected from the group consisting of an oxygen atom, a sulfur atom, a silicon atom and a nitrogen atom.

As for the aliphatic hydrocarbon group whose main chain is composed of 4 to 60 carbon atoms, n-butyl, n-pentyl, n-hexyl, n-heptyl, n-octyl, n-nonyl, n-decyl, n-decenyl, lauryl, myristyl, myristoyl, n-pentadecyl, n-pentadecenyl, palmityl, palmitoyl, n-hexadecadienyl, n-hexadecatrienyl, n-hexadecatetraenyl, n-heptadecanyl, n-heptadecenyl, stearyl, oleyl, linoyl, α-linolenyl, γ-linolenyl, n-octadecatetraenyl, arachidinyl, n-eicosenyl, n-eicosadienyl, n-eicosatrienyl, n-eicosatetraenyl, arachidonyl, n-eicosapentaenyl, n-heneicosapentadecenyl, behenyl, n-dococenyl, n-docosadienyl, n-docosatetradecenyl, n-docosapentaenyl, n-docosahexaenyl, lignocerinyl and tetracocenyl can be cited. Among these groups, groups whose main chain is composed of 20 or less carbon atoms, such as n-butyl, n-pentyl, n-hexyl, n-heptyl, n-octyl, n-nonyl, n-decyl, lauryl, n-pentadecyl, stearyl and the like, are preferable. Unless a monomer having an aliphatic hydrocarbon group whose main chain is composed of 4 or more carbon atoms is used as the second acrylic monomer, improvement in the formability of the resulting copolymer cannot be achieved. Meanwhile, if a monomer having an aliphatic hydrocarbon group whose main chain is composed of more than 60 carbon atoms is used as the second acrylic monomer, the resulting copolymer offers reduced normal temperature elastic modulus and heat resistance.

In addition, some of the carbon atoms in the aliphatic hydrocarbon group (preferably 50% or less of the total carbon atoms) may be substituted with at least one atom selected from the group consisting of an oxygen atom, a sulfur atom, a silicon atom and a nitrogen atom and, as for the resulting aliphatic group, 2-ethoxyethyl, 3-ethoxydecyl, 2-methylthiohexyl, 5-trimethylsilylpentyl, 5-dimethylaminooctyl and the like can be cited.

Furthermore, in the case where one of $R_5$ and $R_6$ represents neither the above-described aliphatic hydrocarbon group nor the above-described aliphatic group, it represents a group selected from the group consisting of an aliphatic hydrocarbon group, an aliphatic group and an aromatic hydrocarbon group. Here, the aliphatic group is one obtained by substituting some of the carbon atoms in the aliphatic hydrocarbon group with at least one atom selected from the group consisting of an oxygen atom, a sulfur atom, a silicon atom and a nitrogen atom, and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom.

In the formula (2), $R_7$ and $R_8$ may be the same or different from each other, each of which represents a group selected from the group consisting of a hydrogen atom, an aliphatic hydrocarbon group, an aliphatic group and an aromatic hydrocarbon group. Here, the aliphatic group is one obtained by substituting some of the carbon atoms in the aliphatic hydrocarbon group with at least one atom selected from the group consisting of an oxygen atom, a sulfur atom, a silicon atom and a nitrogen atom, and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom. However, from the viewpoint of further enhancing polymerization reactivity, it is particularly preferable that each of $R_7$ and $R_8$ represents a hydrogen atom.

Concerning the acrylic copolymer of the present invention, the second acrylic monomer needs to be mixed so that it constitutes from 1 to 50% of total monomer units in the resulting copolymer, preferably from 1 to 40% in the case where the second acrylic monomer includes an aliphatic hydrocarbon group whose main chain is composed of 6 to 7 carbon atoms, and preferably from 1 to 30% in the case where the second acrylic monomer includes an aliphatic hydrocarbon group whose main chain is composed of 8 to 60 carbon atoms. If the mixing ratio of the second acrylic monomer exceeds the aforementioned upper limit, the resulting copolymer undesirably offers reduced normal temperature elastic modulus and heat resistance. On the other hand, if the mixing ratio of the second acrylic monomer is below the aforementioned lower limit, improvement in the formability of the resulting copolymer cannot be sufficiently achieved. Note that, one type of acrylic monomer, or acrylic monomers obtained by mixing two or more types of acrylic monomers may be used as the second acrylic monomer according to the present invention.

When two or more types of acrylic monomers are used as the second acrylic monomer, the preferable proportion of the second acrylic monomers in the total monomer units of the resulting copolymer can be given by the following formula. Specifically, assuming that the preferable mixing ratio of the second acrylic monomer in the case where only one type of acrylic monomer "n" is mixed is Xn (%), and that the proportion of the acrylic monomer "n" included in the total second acrylic monomers which undergo copolymerization is Yn (%), the preferable mixing ratio of the second acrylic monomers is equal to or less than the value calculated using the following formula:

$$X_1*Y_1/100+X_2*Y_2/100++Xn*Yn/100$$

The acrylic copolymer of the present invention is formed by copolymerizing the first acrylic monomer with the second acrylic monomer, and publicly known polymerization methods can be adopted to prepare the acrylic copolymer of the present invention. Publicly known polymerization methods applicable to the present invention as described above include emulsion polymerization, radical polymerization, anionic polymerization or the like. Moreover, a publicly known polymerization initiator (2,2'-azobisisobutyronitrile, benzoyl peroxide, ammonium persulfate, n-butyllithium or the like) and a publicly known solvent (xylene, toluene, isopropanol, water or the like) can be selected as appropriate for the preparation of the acrylic copolymer of the present invention.

In addition, conditions for the polymerization reaction are not particularly limited, and are appropriately set in accordance with the polymerization method to be adopted. The following conditions may be generally adopted: the content of the polymerization initiator relative to monomers is around 0.01 to 10 mol %; monomer concentration of around 10 to 100 wt %; inert gas atmosphere such as nitrogen gas atmosphere; reaction temperature of around −100 to 100° C.; and reaction time of around 1 to 48 hours.

The acrylic copolymer of the present invention, which is formed by copolymerizing the above-described first acrylic monomer with the above-described second acrylic monomer, is represented by the following general formula (3):

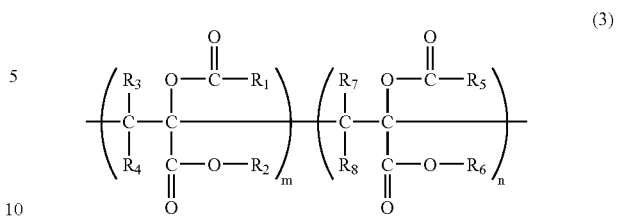

where $R_1$ to $R_8$ in the formula (3) are synonymous with $R_1$ to $R_4$ in the formula (1) and $R_5$ to $R_8$ in the formula (2).

In addition, the acrylic copolymer of the present invention may be a block copolymer or a random copolymer. However, a random copolymer is preferable from the viewpoint of preventing the acrylic copolymer from offering the properties of homopolymer consisting solely of a second acrylic monomer (i.e. low normal temperature elastic modulus and heat resistance).

Further, the preferable molecular weight range of the acrylic copolymer of the present invention is from 10000 to 500000, preferably from 10000 to 200000, in terms of number-average molecular weight. If the number-average molecular weight of the acrylic copolymer of the present invention is lower than 10000, the molded product thereof tends to be fragile. Meanwhile, if the number-average molecular weight of the acrylic copolymer of the present invention is higher than 500000, it tends to be difficult to mold the acrylic copolymer.

According to the acrylic copolymer of the present invention as described above, the following high level normal temperature elastic modulus and excellent formability can be achieved at the same time: the storage modulus at 25° C. is preferably $1 \times 10^9$ Pa or above; and the storage modulus at 250° C. is preferably $1 \times 10^7$ Pa or below.

As described above, the acrylic copolymer of the present invention has such an excellent formability that the storage modulus at 250° C. is preferably $1 \times 10^7$ Pa or below, and is therefore excellent as a resin material for producing a molded product. Conditions for producing the molded product made of the acrylic copolymer of the present invention are not particularly limited. However, since the molded product tends to be subject to thermal decomposition at temperatures above 270° C., the molding temperature is preferably set to around 180 to 260° C.

Moreover, molding methods for the production of a molded product made of the acrylic copolymer of the present invention are not particularly limited. Any of injection molding, press molding, extrusion molding, spinning and the like can be suitably adopted.

In addition, additives such as fillers, plasticizers, pigments, stabilizers, antistats, ultraviolet absorbers, antioxidants, flame retardants, releasers, slip additives, dyes, antimicrobial agents and end cappers may be added to the acrylic copolymer of the present invention as far as the properties of the copolymer are not impaired. In the acrylic copolymer of the present invention, the content of these additives is preferably 30 wt % or less.

EXAMPLES

Hereinafter, the present invention will be further described in detail on the basis of examples and comparative examples. However, the present invention is not limited to the following examples.

(Preparation of Acrylic Monomers)

Firstly, ethyl α-acetoxyacrylate and propyl α-acetoxyacrylate were synthesized by the route shown in the following reaction formula (4), ethyl α-benzoyloxyacrylate was synthesized by the route shown in the reaction formula (4'), butyl α-acetoxyacrylate, octyl α-acetoxyacrylate, stearyl α-acetoxyacrylate and 2-ethoxyethyl α-acetoxyacrylate were synthesized by the route shown in the reaction formula (5), and ethyl α-octanoyloxyacrylate was synthesized by the route shown in the reaction formula (5'). However, ethyl pyruvate is commercially available as a synthetic intermediate for the preparation of ethyl α-acetoxyacrylate, ethyl α-benzoyloxyacrylate and ethyl α-octanoyloxyacrylate, and therefore was used as a starting material.

(Reaction formula 4)

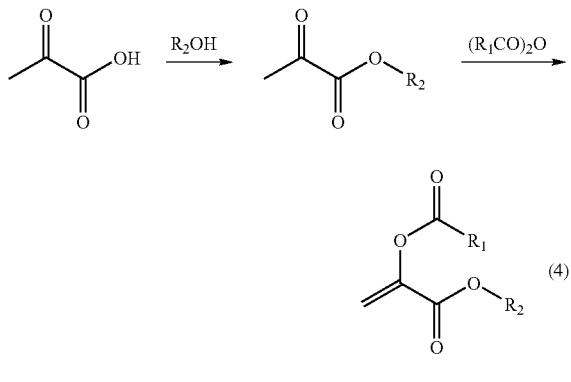

(Reaction formula 4')

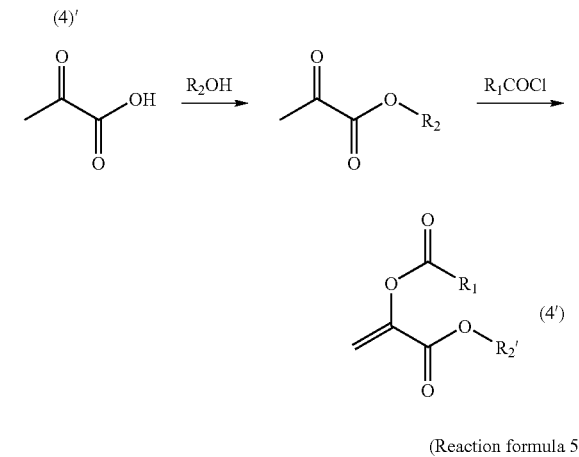

(Reaction formula 5)

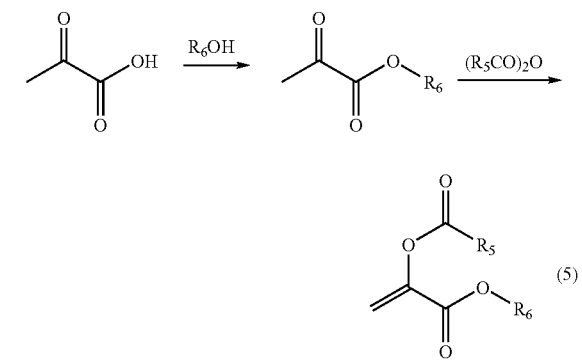

(Reaction formula 5')

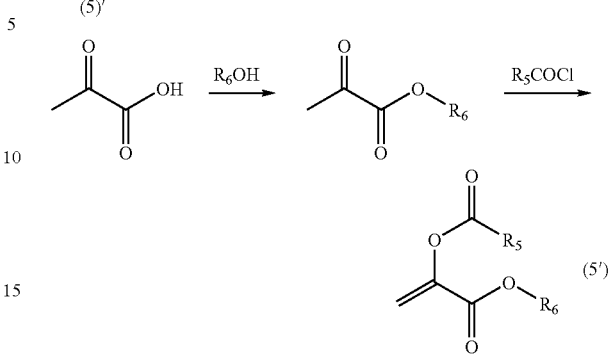

(a) ethyl α-acetoxyacrylate

To a mixture of ethyl pyruvate (315 g, 2.7 mol) and acetic anhydride (554 g, 5.4 mol), p-toluenesulfonic acid monohydrate (8 g) was added, and then was stirred at 120° C. for 24 hours under nitrogen flow. Acetic acid which had been produced by reaction and excess acetic anhydride were removed from the resultant reaction solution under a reduced pressure (40 to 50 mmHg). Thereafter, ethyl α-acetoxyacrylate (250 g, yield: 58%) was obtained using reduced pressure distillation (35 to 40 mmHg, 90 to 103° C.).

(b) propyl α-acetoxyacrylate

A toluene solution (1 L) containing pyruvic acid (440 g, 5.0 mol), n-propanol (300 g, 5.0 mol) and p-toluenesulfonic acid monohydrate (2.5 g) was heated and refluxed for 16 hours under nitrogen flow. The reaction led to generation of water in the system. However, the water was removed using Dean-Stark trap. The resultant reaction solution was cooled down to room temperature, followed by removal of toluene using an evaporator under a reduced pressure. The residual was then purified using reduced pressure distillation (40 mmHg, 85 to 90° C.) to give propyl pyruvate (400 g, yield: 62%).

Moreover, p-toluenesulfonic acid monohydrate (5 g) was added to a mixture of the resulting propyl pyruvate (195 g, 1.5 mol) and acetic anhydride (306 g, 3.0 mol). The mixture was then stirred at 120° C. for 25 hours under nitrogen flow. Acetic acid which had been produced by reaction and excess acetic anhydride were removed from the resultant reaction solution under a reduced pressure (5 mmHg). Thereafter, propyl α-acetoxyacrylate (180 g, yield: 69%) was obtained using reduced pressure distillation (2 mmHg, 50 to 55° C.).

(c) ethyl α-benzoyloxyacrylate

While ethyl pyruvate (174 g, 1.5 mol) was being stirred at 0° C., pyridine (120 g, 1.5 mol) was dropped into the ethyl pyruvate. After it was stirred at 0° C. for 10 minutes, benzoyl chloride (210 g, 1.5 mol) was slowly dropped into this mixture. After the temperature of the reaction solution reached room temperature, the reaction solution was stirred for 48 hours. An aqueous solution of saturated sodium hydrogencarbonate and diethyl ether were added to the reaction solution, and an organic layer was separated by use of a separating funnel. Diethyl ether was again added to the aqueous layer and an organic compound was extracted. The obtained organic layer was then mixed with the organic compound, and sodium sulfate was added for dehydration. Thereafter, the sodium sulfate was removed by filtration and the solvent was removed by use of an evaporator under a reduced pressure. The concentrate was distilled under a reduced pressure (1 mmHg, 92 to 102° C.) to give ethyl α-benzoyloxyacrylate (180 g, yield: 54%).

(d) butyl α-acetoxyacrylate

A toluene solution (1 L) containing pyruvic acid (440 g, 5.0 mol), n-butanol (371 g, 5.0 mol) and p-toluenesulfonic acid monohydrate (2.5 g) was heated and refluxed for 16 hours under nitrogen flow. The reaction led to generation of water in the system. However, the water was removed using Dean-Stark trap. The resultant reaction solution was cooled down to room temperature, followed by removal of toluene using an evaporator under a reduced pressure. The residual was then purified using reduced pressure distillation (40 mmHg, 93 to 100° C.) to give butyl pyruvate (505 g, yield: 70%).

Moreover, p-toluenesulfonic acid monohydrate (5 g) was added to a mixture of the resulting butyl pyruvate (235 g, 1.6 mol) and acetic anhydride (333 g, 3.3 mol). The mixture was then stirred at 120° C. for 25 hours under nitrogen flow. Acetic acid which had been produced by reaction and excess acetic anhydride were removed from the resultant reaction solution under a reduced pressure (5 mmHg). Thereafter, butyl α-acetoxyacrylate (200 g, yield: 67%) was obtained using reduced pressure distillation (2 mmHg, 56 to 63° C.).

(e) octyl α-acetoxyacrylate

A toluene solution (1 L) containing pyruvic acid (440 g, 5.0 mol), n-octanol (651 g, 5.0 mol) and p-toluenesulfonic acid monohydrate (2.5 g) was heated and refluxed for 16 hours under nitrogen flow. The reaction led to generation of water in the system. However, the water was removed using Dean-Stark trap. The resultant reaction solution was cooled down to room temperature, followed by removal of toluene using an evaporator under a reduced pressure. The residual was then purified using reduced pressure distillation (2 mmHg, 82 to 92° C.) to give octyl pyruvate (762 g, yield: 76%).

Moreover, p-toluenesulfonic acid monohydrate (5 g) was added to a mixture of the resulting octyl pyruvate (300 g, 1.5 mol) and acetic anhydride (306 g, 3.0 mol). The mixture was then stirred at 120° C. for 27 hours under nitrogen flow. Acetic acid which had been produced by reaction and excess acetic anhydride were removed from the resultant reaction solution under a reduced pressure (5 mmHg). Thereafter, octyl α-acetoxyacrylate (215 g, yield: 59%) was obtained using reduced pressure distillation (1 mmHg or below, 80 to 102° C.).

(f) stearyl α-acetoxyacrylate

A toluene solution (1 L) containing pyruvic acid (220 g, 2.5 mol), stearyl alcohol (675 g, 2.5 mol) and p-toluenesulfonic acid monohydrate (1.2 g) was heated and refluxed for 16 hours under nitrogen flow. The reaction led to generation of water in the system. However, the water was removed using Dean-Stark trap. The resultant reaction solution was cooled down to room temperature, followed by removal of toluene using an evaporator under a reduced pressure. The residual was then purified using reduced pressure distillation (1 mmHg, 110 to 120° C.) to give stearyl pyruvate (512 g, yield: 80%).

Moreover, p-toluenesulfonic acid monohydrate (3 g) was added to a mixture of the resulting stearyl pyruvate (256 g, 1.0 mol) and acetic anhydride (204 g, 2.0 mol). The mixture was then stirred at 120° C. for 24 hours under nitrogen flow. Acetic acid which had been produced by reaction and excess acetic anhydride were removed from the resultant reaction solution under a reduced pressure (5 mmHg). Thereafter, stearyl α-acetoxyacrylate (200 g, yield: 67%) was obtained using reduced pressure distillation under high vacuum.

(g) 2-ethoxyethyl α-acetoxyacrylate

A toluene solution (1 L) containing pyruvic acid (440 g, 5.0 mol), 2-ethoxyethanol (450 g, 5.0 mol) and p-toluenesulfonic acid monohydrate (2.5 g) was heated and refluxed for 16 hours under nitrogen flow. The reaction led to generation of water in the system. However, the water was removed using Dean-Stark trap. The resultant reaction solution was cooled down to room temperature, followed by removal of toluene using an evaporator under a reduced pressure. The residual was then purified using reduced pressure distillation (40 mmHg, 100 to 105° C.) to give 2-ethoxyethyl pyruvate (544 g, yield: 68%).

Moreover, p-toluenesulfonic acid monohydrate (5 g) was added to a mixture of the resulting 2-ethoxyethyl pyruvate (240 g, 1.5 mol) and acetic anhydride (300 g, 3.0 mol). The mixture was then stirred at 120° C. for 24 hours under nitrogen flow. Acetic acid which had been produced by reaction and excess acetic anhydride were removed from the resultant reaction solution under a reduced pressure (5 mmHg). Thereafter, 2-ethoxyethyl α-acetoxyacrylate (150 g, yield: 50%) was obtained using reduced pressure distillation (2 mmHg, 65 to 70° C.).

(h) ethyl α-octanoyloxyacrylate

While ethyl pyruvate (174 g, 1.5 mol) was being stirred at 0° C., pyridine (120 g, 1.5 mol) was dropped into the ethyl pyruvate. After it was stirred at 0° C. for 10 minutes, octanoyl chloride (243 g, 1.5 mol) was slowly dropped into this mixture. After the temperature of the reaction solution reached room temperature, the reaction solution was stirred for 48 hours. An aqueous solution of saturated sodium hydrogencarbonate and diethyl ether were added to the reaction solution, and an organic layer was separated by use of a separating funnel. Diethyl ether was again added to an aqueous layer and an organic compound was extracted. The obtained organic layer was then mixed with the organic compound, and sodium sulfate was added for dehydration. Thereafter, the sodium sulfate was removed by filtration and the solvent was removed by use of an evaporator under a reduced pressure. The concentrate was distilled under a reduced pressure (1 mmHg, 95 to 100° C.) to give ethyl α-octanoyloxyacrylate (126 g, yield: 34%).

Comparative Example 1

Homopolymer of ethyl α-acetoxyacrylate

Ethyl α-acetoxyacrylate (100 g) and 2,2'-azobisisobutyronitrile (0.4 mol % relative to monomer) were dissolved in a predetermined amount of xylene (monomer concentration: 62.5 wt %). After nitrogen bubbling for 10 minutes, the resultant solution was stirred at 60° C. for 10 hours under nitrogen flow, thereby proceeding polymerization. The resultant reaction solution was dissolved in dichloromethane (300 ml). Thereafter, this solution was slowly dropped into methanol (5 L). The precipitated white polymer was then recovered by filtration, and was dried in vacuo overnight. In this way, the homopolymer of ethyl α-acetoxyacrylate was obtained. This homopolymer has a number-average molecular weight (Mn) of 80,000 and a weight-average molecular weight (Mw) of 140,000.

Example 1

Copolymer of ethyl α-acetoxyacrylate and butyl α-acetoxyacrylate

Ethyl α-acetoxyacrylate (60 g), butyl α-acetoxyacrylate (40 g) and 2,2'-azobisisobutyronitrile (0.4 mol % relative to monomer) were dissolved in a predetermined amount of xylene (monomer concentration: 80 wt %). After nitrogen bubbling for 10 minutes, the resultant solution was stirred at 60° C. for 10 hours under nitrogen flow, thereby proceeding polymerization. The resultant reaction solution was dissolved in dichloromethane (300 ml). Thereafter, this solution was slowly dropped into methanol (5 L). The precipitated white polymer was then recovered by filtration, and was dried in vacuo overnight. In this way, the copolymer of ethyl α-acetoxyacrylate and butyl α-acetoxyacrylate (60:40 weight ratio) was obtained. This copolymer has a number-average molecular weight (Mn) of 80,000 and a weight-average molecular weight (Mw) of 160,000.

Example 2

Copolymer of ethyl α-acetoxyacrylate and octyl α-acetoxyacrylate

Ethyl α-acetoxyacrylate (80 g), octyl α-acetoxyacrylate (20 g) and 2,2'-azobisisobutyronitrile (0.4 mol % relative to monomer) were dissolved in a predetermined amount of xylene (monomer concentration: 80 wt %). After nitrogen bubbling for 10 minutes, the resultant solution was stirred at 60° C. for 10 hours under nitrogen flow, thereby proceeding polymerization. The resultant reaction solution was dissolved in dichloromethane (300 ml). Thereafter, this solution was slowly dropped into methanol (5 L). The precipitated white polymer was then recovered by filtration, and was dried in vacuo overnight. In this way, the copolymer of ethyl α-acetoxyacrylate and octyl α-acetoxyacrylate (80:20 weight ratio) was obtained. This copolymer has a number-average molecular weight (Mn) of 90,000 and a weight-average molecular weight (Mw) of 190,000.

Example 3

Copolymer of propyl α-acetoxyacrylate and octyl α-acetoxyacrylate

The copolymer of propyl α-acetoxyacrylate and octyl α-acetoxyacrylate (80:20 weight ratio) was prepared by the same process as that used in the example 1. The prepared copolymer has a number-average molecular weight (Mn) of 100,000, and a weight-average molecular weight (Mw) of 190,000.

Example 4

Copolymer of ethyl α-benzoyloxyacrylate and butyl α-acetoxyacrylate

The copolymer of ethyl α-benzoyloxyacrylate and butyl α-acetoxyacrylate (60:40 weight ratio) was prepared by the same process as that used in the example 1. The prepared copolymer has a number-average molecular weight (Mn) of 85,000, and a weight-average molecular weight (Mw) of 160,000.

Example 5

Copolymer of ethyl α-benzoyloxyacrylate and octyl α-acetoxyacrylate

The copolymer of ethyl α-benzoyloxyacrylate and octyl α-acetoxyacrylate (80:20 weight ratio) was prepared by the same process as that used in the example 1. The prepared copolymer has a number-average molecular weight (Mn) of 90,000, and a weight-average molecular weight (Mw) of 170,000.

Example 6

Copolymer of ethyl α-acetoxyacrylate and stearyl α-acetoxyacrylate

The copolymer of ethyl α-acetoxyacrylate and stearyl α-acetoxyacrylate (85:15 weight ratio) was prepared by the same process as that used in the example 1. The prepared copolymer has a number-average molecular weight (Mn) of 90,000, and a weight-average molecular weight (Mw) of 190,000.

Example 7

Copolymer of ethyl α-acetoxyacrylate and ethyl α-octanoyloxyacrylate

The copolymer of ethyl α-acetoxyacrylate and ethyl α-octanoyloxyacrylate (75:25 weight ratio) was prepared by the same process as that used in the example 1. The prepared copolymer has a number-average molecular weight (Mn) of 80,000, and a weight-average molecular weight (Mw) of 150,000.

Example 8

Copolymer of ethyl α-acetoxyacrylate and 2-ethoxyethyl α-acetoxyacrylate

The copolymer of ethyl α-acetoxyacrylate and 2-ethoxyethyl α-acetoxyacrylate (80:20 weight ratio) was prepared by the same process as that used in the example 1. The prepared copolymer has a number-average molecular weight (Mn) of 100,000, and a weight-average molecular weight (Mw) of 200,000.

(Measurement of Viscoelasticity)

Concerning the copolymers prepared in the examples 1 to 8, the homopolymer prepared in the comparative example 1 and PMMA (trade name: PARAPET G1000, manufactured by KURARAY Co., Ltd.), the storage modulus (viscoelasticity) thereof was measured at various temperatures by use of a dynamic viscoelasticity measurement instrument (trade name: DVA-220, manufactured by IT Keisokuseigyo Corporation) Table 1 and FIG. 1 show the obtained results.

As can be seen from the results shown in Table 1 and FIG. 1, the homopolymer of ethyl α-acetoxyacrylate showed higher heat resistance than PMMA. However, this homopolymer did not soften (i.e. the storage modulus thereof becomes not great than $1 \times 10^7$ Pa) at higher temperatures, and began to thermally decompose at or above 270° C. By contrast, each of the copolymers prepared in the examples 1 to 8 offered an elastic modulus of around normal temperature (a normal temperature elastic modulus) and heat resistance, which are almost equal to those of the homopolymer of ethyl α-acetoxyacrylate. However, these copolymers showed a storage modulus of not greater than $1 \times 10^7$ Pa below the high temperature at which the copolymers began to decompose (i.e. 250° C.). In fact, typical molding methods (such as injection molding) were able to be adopted to mold these copolymers.

TABLE 1

| | Storage modulus (unit: Pa) | | | | | |
|---|---|---|---|---|---|---|
| | 25° C. | 50° C. | 100° C. | 150° C. | 200° C. | 250° C. |
| PMMA | $3.9 \times 10^9$ | $3.2 \times 10^9$ | $9.3 \times 10^8$ | $3.2 \times 10^6$ | * | * |
| comparative example 1 | $4.0 \times 10^9$ | $3.6 \times 10^9$ | $2.0 \times 10^9$ | $2.1 \times 10^8$ | $3.6 \times 10^7$ | $2.2 \times 10^7$ |
| example 1 | $5.7 \times 10^9$ | $5.1 \times 10^9$ | $3.4 \times 10^9$ | $4.3 \times 10^8$ | $2.4 \times 10^7$ | $2.7 \times 10^6$ |
| example 2 | $5.0 \times 10^9$ | $4.6 \times 10^9$ | $3.1 \times 10^9$ | $2.9 \times 10^8$ | $4.9 \times 10^6$ | $5.7 \times 10^5$ |
| example 3 | $4.5 \times 10^9$ | $4.0 \times 10^9$ | $2.8 \times 10^9$ | $2.5 \times 10^8$ | $3.2 \times 10^6$ | $4.5 \times 10^5$ |
| example 4 | $5.6 \times 10^9$ | $5.2 \times 10^9$ | $3.2 \times 10^9$ | $4.2 \times 10^8$ | $2.6 \times 10^7$ | $2.6 \times 10^6$ |
| example 5 | $5.2 \times 10^9$ | $4.7 \times 10^9$ | $3.0 \times 10^9$ | $2.6 \times 10^8$ | $4.4 \times 10^6$ | $5.2 \times 10^5$ |
| example 6 | $4.0 \times 10^9$ | $3.8 \times 10^9$ | $1.4 \times 10^9$ | $1.5 \times 10^8$ | $3.1 \times 10^6$ | $4.1 \times 10^5$ |
| example 7 | $4.5 \times 10^9$ | $3.9 \times 10^9$ | $2.6 \times 10^9$ | $2.0 \times 10^8$ | $4.2 \times 10^6$ | $1.9 \times 10^5$ |
| example 8 | $5.1 \times 10^9$ | $4.5 \times 10^9$ | $2.9 \times 10^9$ | $2.3 \times 10^8$ | $3.5 \times 10^6$ | $1.2 \times 10^5$ |

*: Measurement was impossible because the polymer had not melted.

(Measurement of Thermal Decomposition Properties)

Figure 2:
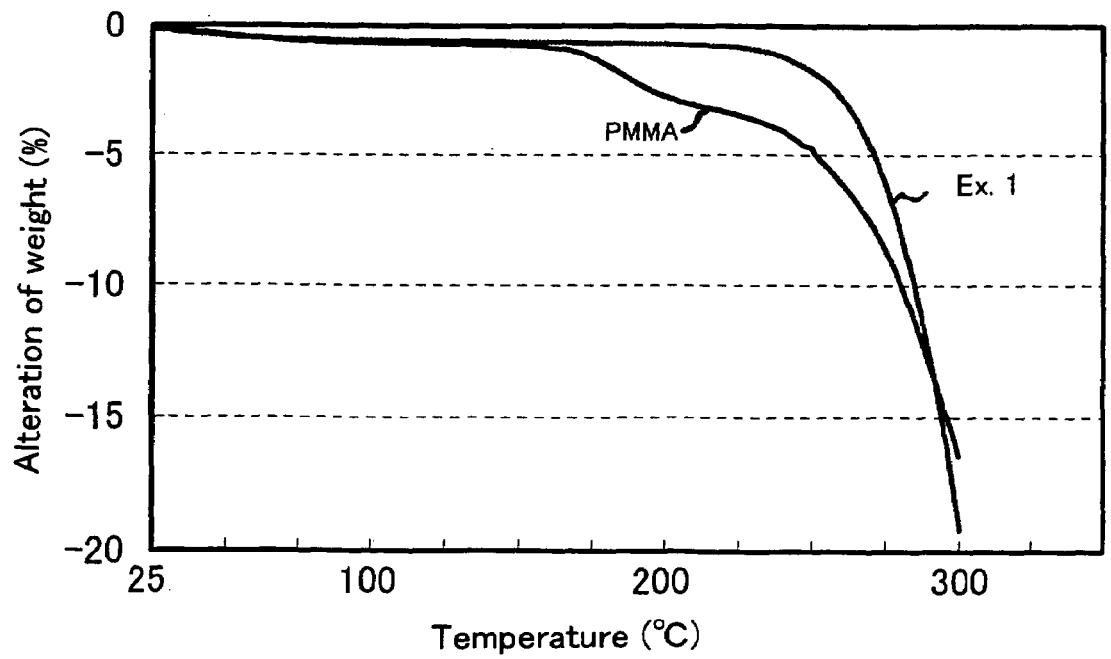
FIG. 2 is a graph showing the measurement results of thermal decomposition properties of the copolymer prepared in example 1 and PMMA.

Concerning the copolymer prepared in the example 1 and PMMA (trade name: PARAPET G1000, manufactured by KURARAY Co., Ltd.), the thermal decomposition properties thereof were measured by use of a thermal analyzer (trade name: Thermo Plus TG 8120, manufactured by Rigaku Corporation). FIG. 2 shows the obtained results.

As can be seen from the results shown in FIG. 2, PMMA began to thermally decompose at 170° C., and by contrast the copolymer prepared in the example 1 began to thermally decompose at or above 270° C. Accordingly, these results also confirm that the acrylic copolymer of the present invention offers higher heat resistance than PMMA.

INDUSTRIAL APPLICABILITY

As described above, according to the present invention, it is possible to provide acrylic resin (an acrylic copolymer) which has a normal temperature elastic modulus equal to that of PMMA, has higher heat resistance than PMMA, and has excellent formability which is achieved because the acrylic resin softens moderately below the thermal decomposition temperature.

The acrylic copolymer of the present invention is a transparent resin material which has a higher normal temperature elastic modulus and heat resistance and is excellent in formability. Accordingly, it can be used in applications where transparency is required and, by adding pigments or the like, it can also be used in applications where opacity is required. The acrylic copolymer of the present invention is therefore of enormous usefulness as a resin material for automobile components (transparent components such as resin glass and a lamp cover, an instrument panel, and interior components such as a carpet and ceiling materials), resin glass, bottles for beverage, housings for electrical appliances, optical waveguide materials, optical cables, cables for optical communication, carpets, fibers for clothes and the like, resin screws, resin nuts, electronic boards and the like.

What is claimed is:
1. An acrylic copolymer consisting of at least
   a first acrylic monomer represented by the following general formula (1):

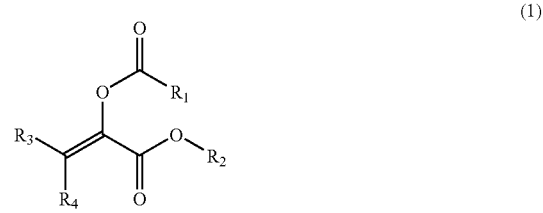

where $R_1$ and $R_2$ may be the same or different from each other, each of which represents a group selected from the group consisting of an aliphatic hydrocarbon group, an aliphatic group and an aromatic hydrocarbon group (here, the main chain of the aliphatic hydrocarbon group is composed of 3 or less carbon atoms; the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and $R_3$ and $R_4$ may be the same or different from each other, each of which represents a group selected from the group consisting of a hydrogen atom, an aliphatic hydrocarbon group, an aliphatic group and an aromatic hydrocarbon group (here, the main chain of the aliphatic hydrocarbon group is composed of 3 or less carbon atoms; the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group is one which is composed of 4 or less fused benzene rings, may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and a second acrylic monomer represented by the following general formula (2):

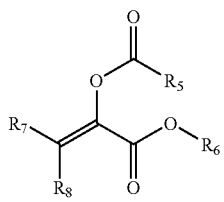

(2)

where $R_5$ and $R_6$ may be the same or different from each other, and at least one of $R_5$ and $R_6$ represents a group selected from the group consisting of an aliphatic hydrocarbon group and an aliphatic group (here, the main chain of the aliphatic hydrocarbon group is composed of 4 to 60 carbon atoms; and the aliphatic group is one obtained by substituting some of the carbon atoms in the aliphatic hydrocarbon group with at least one atom selected from the group consisting of an oxygen atom, a sulfur atom, a silicon atom and a nitrogen atom), and in the case where one of the $R_5$ and $R_6$ represents neither the aliphatic hydrocarbon group nor the aliphatic group, it represents a group selected from the group consisting of an aliphatic hydrocarbon group, an aliphatic group and an aromatic hydrocarbon group (here, the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), and $R_7$ and $R_8$ may be the same or different from each other, each of which represents a group selected from the group consisting of a hydrogen atom, an aliphatic hydrocarbon group, an aliphatic group and an aromatic hydrocarbon group (here, the aliphatic group is one obtained by substituting some of the carbon atoms in the aliphatic hydrocarbon group with at least one atom selected from the group consisting of an oxygen atom, a sulfur atom, a silicon atom and a nitrogen atom; and the aromatic hydrocarbon group may include at least one substituent group selected from the group consisting of the aliphatic hydrocarbon group and the aliphatic group, and may be one obtained by substituting some of the carbon atoms in the aromatic hydrocarbon group with at least one atom selected from the group consisting of a nitrogen atom, an oxygen atom and a sulfur atom), wherein the first acrylic monomer makes up 50 to 99% of total monomer units in the copolymer.

2. The acrylic copolymer according to claim 1, wherein the $R_1$ and $R_2$ may be the same or different from each other, each of which represents a group selected from the group consisting of methyl, ethyl, propyl, isopropyl, t-butyl, isobutyl, 1,1-dimethylpropyl, 1,1,2-trimethylpropyl, 1,2,2-trimethylpropyl, 2,2-dimethylpropyl, 1,2-dimethylpropyl, 1-ethylpropyl, 1,1,2,2-tetramethylpropyl and 2-methylpropyl.

3. The acrylic copolymer according to claim 1, wherein the $R_1$ and $R_2$ may be the same or different from each other, each of which represents a group selected from the group consisting of methyl, ethyl, isopropyl and t-butyl.

4. The acrylic copolymer according to claim 1, wherein each of the $R_3$ and $R_4$ represents a hydrogen atom.

5. The acrylic copolymer according to claim 1, wherein the $R_5$ and $R_6$ may be the same or different from each other, and at least one of the $R_5$ and $R_6$ represents a group selected from the group consisting of n-butyl, n-pentyl, n-hexyl, n-heptyl, n-octyl, n-nonyl, n-decyl, n-decenyl, lauryl, myristyl, myristoyl, n-pentadecyl, n-pentadecenyl, palmityl, palmitoyl, n-hexadecadienyl, n-hexadecatrienyl, n-hexadecatetraenyl, n-heptadecanyl, n-heptadecenyl, stearyl, oleyl, linoyl, α-linolenyl, γ-linolenyl, n-octadecatetraenyl, arachidinyl, n-eicosenyl, n-eicosadienyl, n-eicosatrienyl, n-eicosatetraenyl, arachidonyl, n-eicosapentaenyl, n-heneicosapentadecenyl, behenyl, n-dococenyl, n-docosadienyl, n-docosatetradecenyl, n-docosapentaenyl, n-docosahexaenyl, lignocerinyl and tetracocenyl.

6. The acrylic copolymer according to claim 1, wherein the $R_5$ and $R_6$ may be the same or different from each other, and at least one of the $R_5$ and $R_6$ represents a group selected from the group consisting of n-butyl, n-pentyl, n-hexyl, n-heptyl, n-octyl, n-nonyl, n-decyl, n-decenyl, lauryl, n-pentadecyl and stearyl.

7. The acrylic copolymer according to claim 1, wherein each of the $R_7$ and $R_8$ represents a hydrogen atom.

8. The acrylic copolymer according to claim 1, wherein a number-average molecular weight is 10000 to 500000.

9. The acrylic copolymer according to claim 1, wherein the second acrylic monomer makes up 1 to 50% of total monomer units in the acrylic copolymer.

10. The acrylic copolymer according to claim 1, wherein, as at least one of the $R_5$ and $R_6$, the second acrylic monomer has an aliphatic hydrocarbon group whose main chain is composed of 6 to 7 carbon atoms, and the second acrylic monomer makes up 1 to 40% of total monomer units in the acrylic copolymer.

11. The acrylic copolymer according to claim 1, wherein, as at least one of the $R_5$ and $R_6$, the second acrylic monomer has an aliphatic hydrocarbon group whose main chain is composed of 8 to 60 carbon atoms, and the second acrylic monomer makes up 1 to 30% of total monomer units in the acrylic copolymer.

12. The acrylic copolymer according to claim 1, which is represented by the following general formula (3):

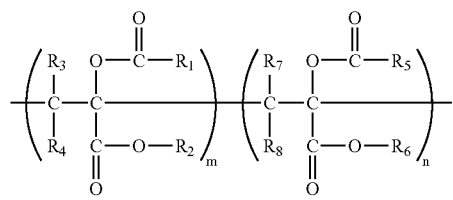

(3)

[where $R_1$ to $R_8$ are synonymous with $R_1$ to $R_4$ in the formula (1) and $R_5$ to $R_8$ in the formula (2), and may be any one of a block copolymer and a random copolymer].

13. The acrylic copolymer according to claim 12, which is a random copolymer.

14. The acrylic copolymer according to claim 1, wherein a storage modulus at 25° C. is $1 \times 10^9$ Pa or above, and a storage modulus at 250° C. is $1 \times 10^7$ Pa or below.

* * * * *